July 7, 1931.  A. N. PASMAN  1,813,709

FLUSH VALVE

Filed Sept. 7, 1929

INVENTOR
Abram N. Pasman
BY
HIS ATTORNEY

Patented July 7, 1931

1,813,709

UNITED STATES PATENT OFFICE

ABRAM N. PASMAN, OF WATERBURY, CONNECTICUT, ASSIGNOR TO SCOVILL MANUFACTURING COMPANY, OF WATERBURY, CONNECTICUT, A CORPORATION OF CONNECTICUT

FLUSH VALVE

Application filed September 7, 1929. Serial No. 390,884.

My present invention relates to an improvement in the auxiliary or release valve mechanism as applied to flush valves of the type shown and described in Letters Patent No. 1,600,774, September 21, 1926. It has been found due to the carelessness or inexperience of the persons handling said mechanism in the repairing or installation of this type of valve, that frequently the cylinder barrel is improperly connected to the gland or that the cap is improperly connected to the cylinder barrel. Under either of these conditions the operating handle makes an unintentional contact with the piston and stem, located in the cylinder barrel, which in turn holds the release valve open. In the operation of flush valves of this type the closing of the main valve depends on building up a water pressure above the piston on which the valve is located. It is readily seen that this pressure cannot be built up as long as the release valve is open and consequently under these conditions there is a continuous discharge of water.

The object of my present invention is to construct an auxiliary or release valve mechanism to eliminate said conditions, regardless of the manner in which the mechanism is assembled or repaired as will be more particularly described hereinafter.

In the drawings:—

Figures 1, 2:
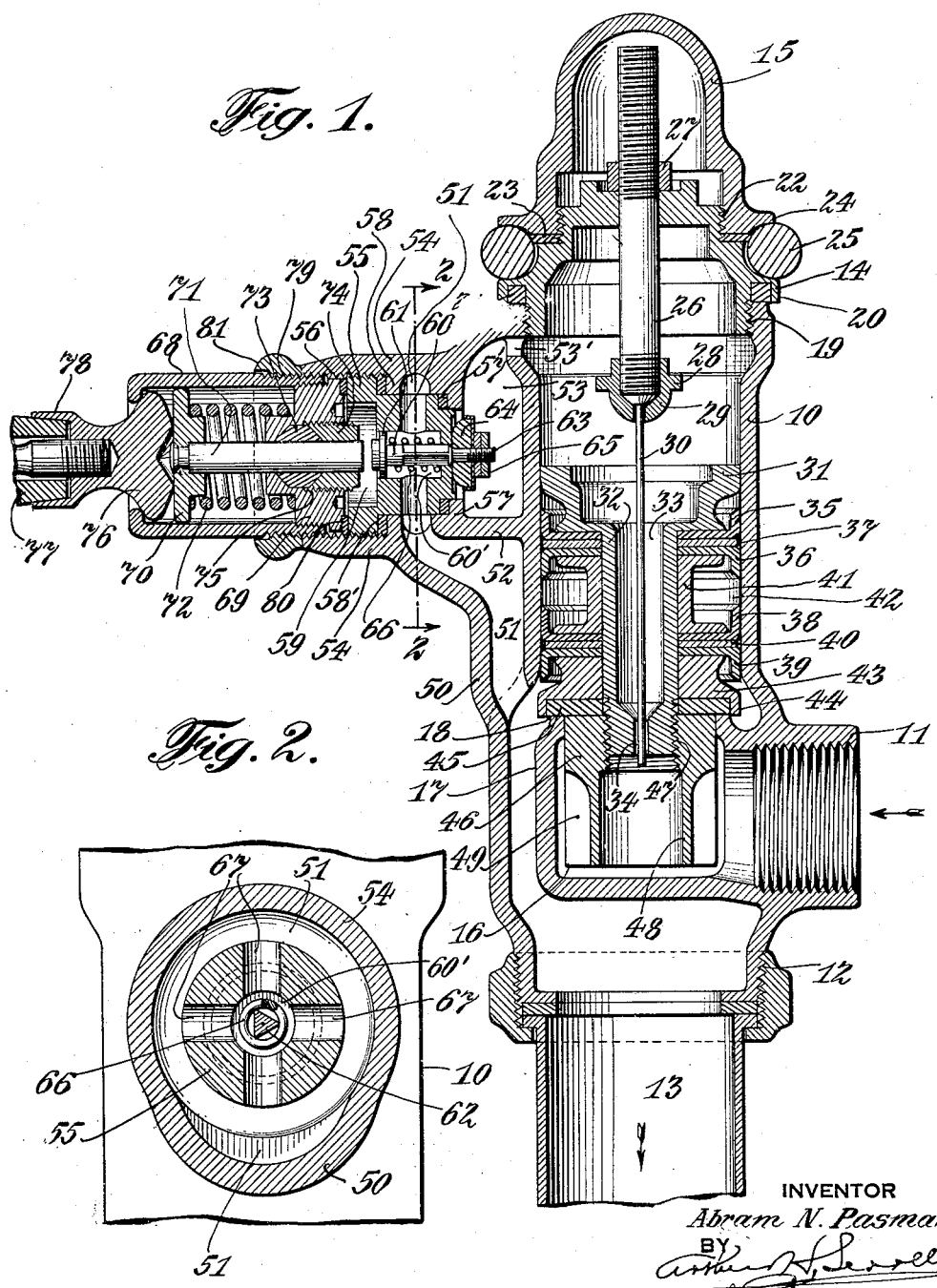
Figure 1 is a central longitudinal section of the present invention illustrating both main and auxiliary valves.
Fig. 2 is a sectional elevation on line 2—2 Figure 1.

Referring to the drawings, the flush valve made in accordance with this invention preferably comprises the usual cylindrical casing 10 which has an inlet connection 11 and an outlet connection 12 to which latter there is suitably secured a discharge pipe 13. The inlet connection is preferably at the side of the casing and the outlet connection at one end thereof, the opposite end of the casing being provided with a head 14 and a cap 15 to both of which further reference will be hereinafter made.

Adjacent the inlet connection 11 there is an inlet chamber 16 made by the circular wall 17. At the upper or outer end thereof there is a valve seat 18 surrounding the discharge from the inlet chamber.

A portion of the head 14 is screw threaded as indicated at 19 so as to be connected in the tapped upper or outer end of the casing 10. This head is also provided with a flange 20 having a recess therein for the reception of a gasket 21 adapted when the head is turned to position to contact with the upper or outer end of the casing to make a tight joint between these parts. The opposite end of the head 14 is also screw threaded as indicated at 22 in order to receive the cap 15 to secure these parts in position with an intermediate gasket 23 for making a tight joint between them. Although in some forms of the invention it is not necessary, in the structure as illustrated the cap 15 is flanged as indicated at 24 to provide a seat for a gasket 25 which is circular in cross section and is fitted between the flange 24 on the cap 15 and the outer portion of the flange 20 on the head 14.

The apparatus includes a rod 26 which passes through a centrally disposed tapped opening in the head 14 so as to be adjustable to position longitudinally therein and which may be secured in an adjusted position by means of a lock nut 27 or otherwise. At the inner end of the rod 26 the same is provided with a stop nut 28 which preferably has a round head 29 with a centrally disposed opening therein for the reception of a pin 30 which extends through the opening and is maintained in position relatively to the stop nut by means of the head of the pin lying within the circular head of the nut and between the same and the adjacent end of the rod 26, the functions of which parts will be hereinafter described.

In the cylindrical casing 10 there is a piston 31. Associated with the piston 31 and forming part thereof is a cylindrical member 32, the passage through which is indicated at 33. At the lower or inner end of the cylinder 32 the passage terminates in a port 34 of materially decreased diameter. The pin 30 passes through this port 34 and the diameter of the pin is appreciably less than the diameter of the port. Fitted over the cylinder 32 there are pairs of spaced cup leather washers. The pair of washers adjacent the head of the piston 31 are indicated at 35 and 36 and between the same there is a spacer washer 37. The other set of cup leather washers are indicated at 38 and 39 and are provided with an intermediate spacer washer 40. On the cylinder 32 and between the cup leather washers 36 and 38 there is a drum or spool 41. This spool 41 provides a means for spacing the inner adjacent cup leather washers and also provides a chamber 42 for a semi-fluid lubricant, as vaseline, although it will be understood that any suitable form of a grease lubricant may be employed. Also on the cylinder 32 there is a valve collar 43 provided with a flange 44 and a recess for the reception of a valve 45 adapted when the parts are in their normal position as indicated in Fig. 1 to bear against the valve seat 18. The valve collar and the sets of cup leather washers with the intermediate spool are maintained in position on the cylinder 32 by a removable piston nut 46, the inner or lower end of the cylinder being exteriorly screw threaded as indicated at 47 to receive the piston nut 46 which may be turned down thereon sufficiently far to force and maintain the members hereinbefore enumerated in their proper positions on the cylinder. The wall of the piston nut 46 is indicated at 48 and on this wall there are suitably spaced longitudinal ribs indicated at 49. The diameter of the piston nut 46 and the distance between the oppositely disposed ribs 49 is approximately equal to the diameter of the discharge opening in the inlet chamber 16 so that in reseating the valve, by a return movement of the piston and associated parts, the piston nut enters the discharge opening in the chamber 16.

The casing is also provided with a wall 50 making provision for a passage 51 between the same and the adjacent portion of the cylindrical wall 10. Also connected to the cylindrical wall is an internal wall 52 making provision for a chamber 53 in which the release valve hereinafter described is located. Located in the casing 10 there is also located a port 53' making connection between the interior of the cylinder and the chamber 53.

In the wall 50 there is a boss 54 having a tapped opening therein adapted to receive a plug 55. The plug is turned into position by the screw threads indicated at 56 until the end thereof which is of a smaller diameter than the threaded portion rests against the flange 57 built upon the internal wall 52, and the threaded portion thereof rests against the flange 58 built upon the boss 54. Washers 57' and 58' respectively are provided between the plug 55 and flanges 57 and 58 to insure a tight joint between the said parts. The threaded portion of the plug 55 is counterbored as indicated at 59 with small grooves along the sides of the bore which enables it to be screwed into place.

Centrally disposed in the plug is an opening 60' in which there is located a plunger 60, one end of which is circular and has a piston 61 integral therewith. The central portion is triangular in cross section as illustrated at 62 and the other end of the plunger which is of a reduced diameter as illustrated at 63 is screw threaded and adapted to carry a release valve 64 maintained in position by nuts 65 or otherwise. A spring 66 maintains the release valve on its seat. Ports 67 connect the opening 60' with the chamber 51 and permit the flow of water or other liquid from passage 53 through the release valve port, around the part of triangular cross section of plunger 62, into passage 51 and to the discharge pipe 13 when the release valve is open.

I also employ a hollow cap 68, one end of which is internally threaded to receive a plug 69. The cap also contains a piston 70 and plunger 71 suitably conected thereto, together with a spring 72 held in position between one face of the piston 70 and the plug 69. Centrally disposed in the plug 69 is a packing 73 which prevents any water or other fluid from passing along the plunger 71 and out of the open end of the cap 68. The packing 73 is held in position by a centrally disposed gland 74 which is threaded as indicated at 75 into the plug 69.

At the open end of the cap and adjacent the piston 70 is located a head 76 which is contained and operative within said cap and is connected to a suitable handle 77 by means of a socket member 78. The opposite end of the cap 68 is also externally threaded as indicated at 79 and adapted to be screwed into position in the boss 54. Between the plugs 55 and 69 is located a washer 80 which prevents leakage between the said parts. A nut 81 is located on the cap 68 and is adapted to be screwed against the end portion of the boss 54 thereby firmly holding the cap in position.

In the operation the parts are normally in the position shown in the drawing, Fig. 1, and in this position the water or other liquid employed with the device acts against the inner end of the piston, but the piston is maintained in position by the water or other liquid entrapped between the same and the upper or outer end thereof filling the chamber between this end of the piston and the cylinder head and also filling the chamber 53 as is customary in this type of apparatus. The movement of the handle 77 in any direction will move the piston 70 against the action of the spring 72 moving the plunger against the end of the piston 61 located in plug 55. A further movement will then move the piston 61 against the action of the spring 66 opening the release valve 64 and permitting a discharge of water or other liquid from the chamber 53 through the passage 51 to the discharge pipe 13. When the entrapped liquid is thus released the pressure at the inlet end of the valve forces the piston upwardly or outwardly thereby opening the valve 45 and permitting the water to flow from the inlet to the outlet connection. The extent of the movement of the piston and consequently the initial quantity of water permitted to flow is controlled by the position of the stop nut 28 which prevents the piston from moving further than that position in which it contacts with the nut. When the handle 77 is released and the auxiliary or release valve returned to its normal position by action of the spring 66 the water or other liquid under pressure passes through the port 34 and gradually accumulates in the chamber at the opposite end of the piston thereby moving the piston in the opposite direction until finally the valve 45 is reseated shutting off the communication between the supply or inlet and discharge connections of the apparatus.

Furthermore, in regard to the auxiliary or release valve construction as hereinbefore described, it is obvious that no matter how the mechanism is connected in assembling or repairing there will be clearance between the stem 71 and stem 60. It follows therefore that the release valve is closed until actuated by movement of the operating lever, and cannot accidentally be held open by any wedging or jamming action in assembling the parts of the apparatus.

I claim as my invention:

1. In a flush valve, a casing enclosing a pressure chamber and having an inlet connection and an outlet connection, a valve adapted to seat against the pressure in the inlet connection for controlling communication between the inlet connection and the outlet connection, a boss extending from the casing, a plug member located in the said boss, a release valve in the pressure chamber, a triangular valve stem mounted in the said plug and carrying the said release valve, a cap member, a plunger plug mounted in the cap member, a plunger operable in the plunger plug, the cap member being adapted to be connected to the said boss with the plunger plug abutting against the release valve plug in such a position that one end of the plunger lies adjacent the end of the valve stem, and means for moving the plunger to shift the valve stem and thereby unseat the said release valve.

2. In a flush valve, a casing enclosing a pressure chamber and containing an inlet connection and an outlet connection, a valve controlling communication between the inlet connection and the outlet connection and adapted to seat against the pressure in the inlet connection, a boss extending from the casing and enclosing a chamber in communication with the said pressure chamber, a release valve plug in the said boss, a triangular release valve stem mounted in the said valve plug, a release valve on the said release valve stem, means for normally maintaining the release valve in a seated position, a cap, a plunger plug mounted in the cap, a plunger operable in the plunger plug, means for normally maintaining the said plunger in an initial position, the said cap being adapted to be connected to the said boss with the plunger spaced from the release valve stem, and means for moving the plunger to contact with and operate the release valve stem to unseat the release valve.

3. In a flush valve, a casing having a boss thereon enclosing a pressure chamber, inlet and outlet connections on the said casing, a valve for controlling communication between the inlet and outlet connections and adapted to seat against the pressure in the inlet connection, a release valve plug mounted in the said boss and having a valve seat thereon and passages therethrough communicating with the said discharge connection, a triangular release valve stem mounted in the said release valve plug, a release valve carried by the said release valve stem, means for normally maintaining the release valve stem in an initial position in which the release valve is seated, a cap member, a plunger plug mounted in the cap member, a plunger movable in the plunger plug, means for normally maintaining the said plunger in an initial position, the said cap being adapted to engage the said boss with the inner end of the plunger adjacent to and spaced from the end of the release valve stem, and means for operating the plunger to shift the release valve stem and thereby unseat the release valve.

4. In a flush valve, a casing having a boss thereon enclosing a pressure chamber, inlet and outlet connections on the said casing, a valve for controlling communication between the inlet and outlet connections and adapted to seat against the pressure in the inlet connection, a release valve plug mounted in the said boss and having a valve seat thereon and passages therethrough communicating with the said discharge connection, a triangular release valve stem mounted in the said release valve plug, a release valve carried by the said release valve stem, a spring coacting with the said release valve plug and stem for normally maintaining the said release valve in a seated position, a cap member, a plunger plug mounted in the cap member, a plunger movable in the plunger plug, a spring for normally maintaining the said plunger in an initial position, the said cap being adapted to engage the said boss with the inner end of the plunger adjacent to and spaced from the end of the release valve stem, and means for operating the plunger to shift the release valve stem and thereby unseat the release valve.

5. In a flush valve, a casing having a boss thereon enclosing a pressure chamber, inlet and outlet connections on the casing, a valve controlling communication between the inlet and outlet connections and adapted to seat against the water pressure, a release valve plug in the said boss, the release valve plug having a valve seat and ports communicating with the discharge connection, a triangular release valve stem mounted in said release valve plug, a release valve carried thereby, a spring for normally maintaining the release valve in a seated position, a cap member, a plug mounted in one end of the cap member, a plunger operable in the plunger plug, a head connected to the plunger and operating in the said cap member, a spring coacting between the said head and plunger plug for yieldingly returning and normally maintaining the plunger plug in an initial position, and a handle member also operating in the said cap for moving the said head to shift the plunger in the direction with the release valve stem to contact with and move the same thereby unseating the release valve.

6. In a flush valve, a casing having a boss thereon enclosing a pressure chamber, inlet and outlet connections on said casing, a valve controlling communication between the inlet and outlet connections and adapted to seat against the water pressure, a release valve plug mounted in the said boss and having a valve seat thereon and passages therethrough communicating with said outlet connection, a triangular release valve stem mounted in the opening defined by the valve seat, a release valve carried thereby, a spring coacting with the said release valve plug and stem for normally maintaining the said release valve in a seated position, a cap member, a plunger plug mounted in the said cap member, a plunger movable in the plunger plug, a spring for normally maintaining the said plunger in an initial position, the said cap being adapted to engage the said boss with the inner end of the plunger adjacent to and spaced away from the end of the release valve stem, and means for operating the plunger to lift the release valve from its seat thereby facilitating the passage of water from the pressure chamber along the sides of the triangular valve stem to the outlet connection.

Signed by me this 3d day of Sept. 1929.

ABRAM N. PASMAN.